United States Patent [19]

Cline

[11] 4,148,373

[45] Apr. 10, 1979

[54] FENDER SUPPORT

[76] Inventor: Erving H. Cline, 379 Walnut St., Stoughton, Mass. 02072

[21] Appl. No.: 811,622

[22] Filed: Jun. 30, 1977

[51] Int. Cl.$^2$ ............................................ B62D 25/16
[52] U.S. Cl. .............................. 280/154.5 R; 403/260
[58] Field of Search ................. 280/154.5 R; 403/260, 403/258, 264, 247

[56] References Cited

U.S. PATENT DOCUMENTS

| 2,189,232 | 2/1940 | Snell | 403/260 |
|---|---|---|---|
| 3,337,238 | 8/1967 | Weasel, Jr. | 280/154.5 R |
| 3,580,604 | 5/1971 | Overend | 280/154.5 R |
| 3,804,542 | 4/1974 | Hammerschmidt | 403/264 |
| 3,940,165 | 2/1976 | Sogoian | 280/154.5 R |

*Primary Examiner*—Joseph F. Peters, Jr.
*Assistant Examiner*—Donn M. McGiehan
*Attorney, Agent, or Firm*—Wolf, Greenfield & Sacks

[57] ABSTRACT

A quarter fender and associated support of the type used with a tractor of a tractor-trailer mounted from the frame of the tractor adjacent rear wheels of the tractor. The support for the fender comprises a tube or pipe accommodating at one end a hefty washer welded into the tube and for receiving a bolt for securing the tube against the frame of the vehicle, a nut being provided in association with the bolt for tightening the support to the vehicle frame.

2 Claims, 3 Drawing Figures

FENDER SUPPORT

BACKGROUND OF THE INVENTION

The present invention relates in general to a fender and associated support and pertains, more particularly, to an improved support for a quarter fender. A quarter fender is usually supported from the frame of a tractor of a tractor-trailer adjacent to the rear wheels for partly covering the rear wheels with one fender being provided on either side of the vehicle.

These quarter fenders have in the past been supported in many different ways. Some of the support structures have not adequately supported the fender thereby causing such problems as punctured tires and damaged gas tanks. Further, if the quarter fender support breaks there is the hazard of the quarter fender essentially flying from the vehicle while traveling on the highway causing damage to other vehicles or an accident.

Accordingly, it is one object of the present invention to provide an improved and reliable support for a quarter fender so that the quarter fender is maintained properly supported from the frame of the vehicle.

Some of the commercially available quarters fenders provide adequate support but are quite complicated to install requiring expensive brackets and a number of bolts and nuts for securing each fender to the frame of the vehicle.

Accordingly, another object of the present invention is to provide a quarter fender and associated support that is relatively simple in construction, that is easy to install, and that requires only minimum number of components to fasten the fender to the frame.

SUMMARY OF THE INVENTION

To accomplish the foregoing and other objects of this invention there is provided a support for a quarter fender for mounting the fender from the frame of a tractor of a tractor-trailer vehicle. This quarter fender is typically mounted adjacent a rear wheel of the tractor and usually a fender is mounted one on each side of the frame. The support in accordance with the present invention comprises a hollow support tube or pipe which is the principal support for the fender; the fender being rigidly secured to a portion of the tube such as with the use of rivets, bolts, U-bolts or the like. A washer having an outer size dimensioned to fit within an end of the support tube is secured in place preferably by welding the washer in the support tube. The washer preferably has a chamfered surface which allows for a dam of weld to provide a strong holding of the washer within the tube. A bolt extends through the tube and washer and also through a hole in the frame and is operative in association with a nut for securing the tube and the quarter fender to the frame of the vehicle.

BRIEF DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

Figure 1:
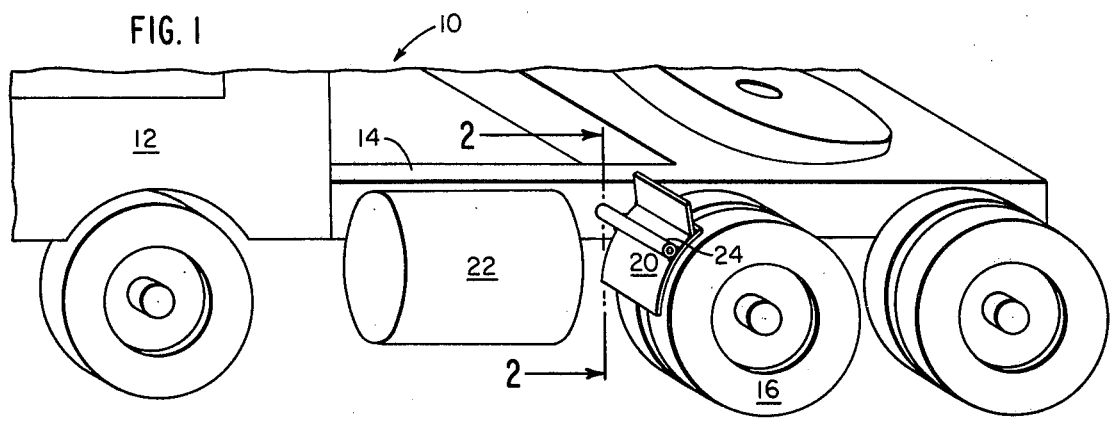
FIG. 1 is a perspective view showing a quarter fender and associated support mounted from a vehicle.

Referring now to the drawings and in particular to FIG. 1, there is shown a tractor 10 of a tractor-trailer having a driving compartment or cab 12 in a conventional support frame 14 supported above the rear wheels 16 of the tractor. FIG. 1 shows a quarter fender 20 mounted from the frame 14 forward of the rear wheels 16 and disposed between the rear wheel and the gas tank 22. A similar quarter fender is also mounted on the opposite side of the tractor in front of the opposite rear wheel. These quarter fenders prevent mud and stones thrown from the tires from striking the tractor and damaging the tractor.

Figure 2:
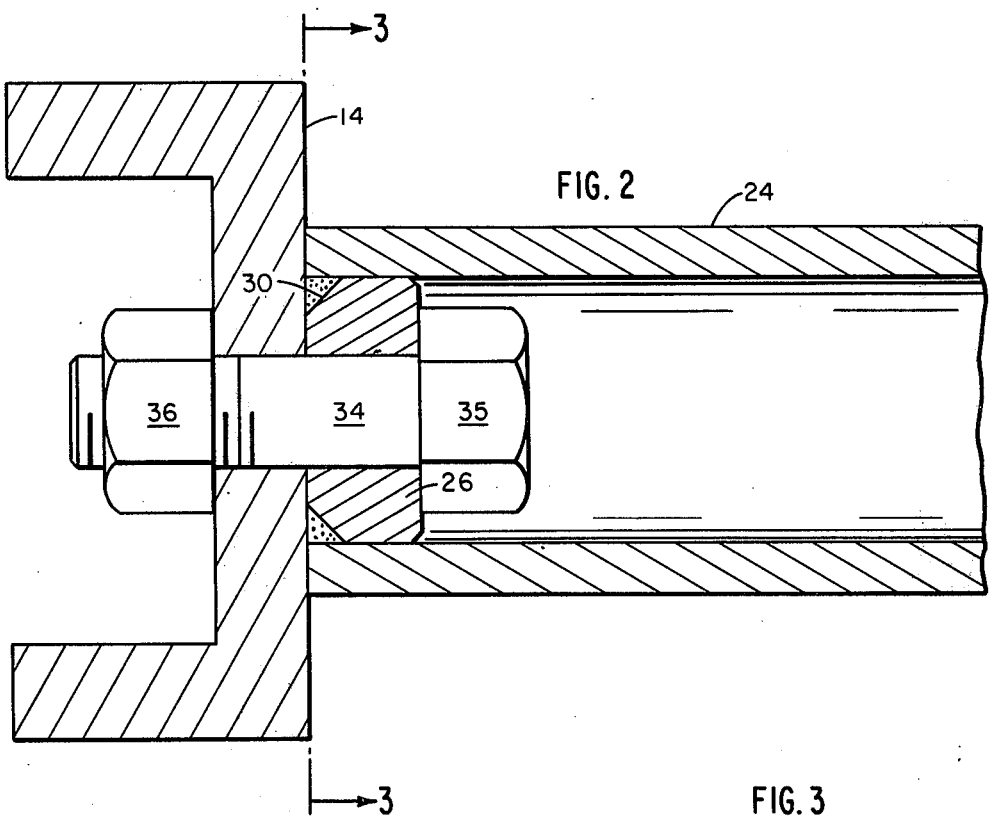
FIG. 2 is a cross-sectional view showing the connection of the support to the vehicle frame.
Figure 3:
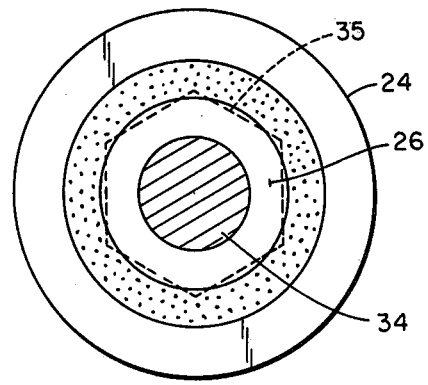
FIG. 3 is a cross-sectional view taken along line 3—3 of FIG. 2.

The fender 20 has secured thereto intermediate its top and bottom ends a support tube 24 which is hollow and may be secured to the fender by welding or other suitable securing means. The hollow tube 24 is for supporting the fender 20 from the frame 14. FIGS. 2 and 3 show the improved means of this invention for securing the hollow support tube or pipe 24 to the frame 14. For this purpose there is provided a washer 26 which is preferably constructed of 1018 steel. This washer is provided with a chamfered surface 30 defining with the end of the tube 24 an annular hollow area for receiving a dam of weld. The method of welding preferably uses low hydrogen weld rods for providing a secure bond between the pipe or tube 24 and the washer 26. The washer is preferably in the tube with a tight drive fit.

The washer 26 is preferably provided with a ⅜ inch diameter hole for receiving a strong grade 8 bolt 34. This bolt also passes through a hole in the frame 14 and a nut 36 is provided screwed onto the end of the bolt 34 for tightening the support tube against the frame.

Usually, there are bolts in the frame and it is simply a case of removing one of these bolts without having to drill the frame and reinserting a longer bolt through the tube 24 for securing the fender to the frame. In order to hold the head 35 of the bolt a standard socket can be used in association with an extension arm extending through the hollow support tube 24.

In order to prevent rotation of the tube 24 and thus also rotation of the fender 20 the end of the tube 24 shown in FIG. 2 may be keyed to the frame. This keying arrangement may simply comprise a stud extending from the end of the support tube and interlocking with a hole in the frame for preventing rotational movement of the support tube. In practice, however, it has been found that by sufficiently tightening the nut 36 to the bolt 35 rotation does not occur. It may also be advisable to use a lock washer in association with the nut 36 or use a special locking nut 36.

Even if it is necessary to drill the frame only a single hole need be drilled, whereas in the prior art the brackets usually required four or more holes for supporting the quarter fender.

One of the important features of the present invention has been found to be the use of a washer of the type shown in FIG. 2 which provides an annular hollow dam for accepting a weld bead. This design permits a heavy weld and an extremely durable bond.

Having described one preferred embodiment of this invention, it should now be apparent to those skilled in the art that numerous other embodiments are contemplated as falling within the scope of this invention. For example, in one alternate embodiment a sweat fit may be provided between the washer and support tube.

What is claimed is:

1. In combination, for a tractor vehicle, a quarter fender, means for mounting the quarter fender and a frame section of the vehicle, said means for mounting supporting the fender from the frame section adjacent a rear wheel of the tractor, the combination comprising;
   a hollow elongated support tube,
   means fixedly securing the fender to a section of the support tube,
   a washer having an outer size dimensioned to tightly fit within and at one end of the support tube and having a central aperture,
   weld means for securing the washer in the support tube at said one end,
   said frame section having a vertical wall for receiving the said one end of the support tube and including a hole therein adapted to be aligned with the central aperture of the washer,
   and bolt and cooperating nut, said bolt extending through the tube, the aperture of the washer and the hole in the frame,
   whereby when said bolt and nut are interengaged both the vertical wall of the frame section and the washer are sandwiched between the head of the bolt and the nut.

2. The combination as set forth in claim 1 wherein said washer has a chamfered surface defining with the support tube an annular hollow track forming a dam for a weld bead, said bolt threadedly engaging with only the nut with an absence of threading with the aperture of the washer and the hole in the frame.

* * * * *